(12) United States Patent
Peek

(10) Patent No.: US 11,318,420 B1
(45) Date of Patent: May 3, 2022

(54) MODULAR THERMAL INSULATING ENCLOSURE FOR DESALINATING SEAWATER

(71) Applicant: The United States of America as represented by the Secretary of the Navy, Arlington, VA (US)

(72) Inventor: Ian M. Peek, Haddon Heights, NJ (US)

(73) Assignee: The United States of America as represented by the Secretary of the Navy, Arlington, VA (US)

(*) Notice: Subject to any disclaimer, the term of this patent is extended or adjusted under 35 U.S.C. 154(b) by 145 days.

(21) Appl. No.: 15/439,169

(22) Filed: Feb. 22, 2017

(51) Int. Cl.
| | |
|---|---|
| B01D 61/36 | (2006.01) |
| B01D 63/02 | (2006.01) |
| C02F 1/44 | (2006.01) |
| C02F 103/08 | (2006.01) |

(52) U.S. Cl.
CPC ........... *B01D 61/364* (2013.01); *B01D 63/02* (2013.01); *C02F 1/447* (2013.01); *B01D 2313/06* (2013.01); *B01D 2313/20* (2013.01); *B01D 2313/38* (2013.01); *C02F 2103/08* (2013.01); *C02F 2201/007* (2013.01)

(58) Field of Classification Search
CPC ............... B01D 63/02; B01D 2313/06; B01D 2313/20; B01D 2313/38; C02F 1/447; C02F 2103/08; C02F 2201/007
See application file for complete search history.

(56) References Cited

U.S. PATENT DOCUMENTS

| | | | |
|---|---|---|---|
| 2,484,893 A * | 10/1949 | Kuno | H05B 3/00 219/526 |
| 3,883,400 A | 5/1975 | Makinsky et al. | |
| 4,222,349 A * | 9/1980 | Kadan | F28D 21/0007 122/20 B |
| 8,167,143 B2 | 5/2012 | Sirkar et al. | |
| 2010/0072135 A1* | 3/2010 | Hanemaaijer | B01D 1/0035 210/640 |
| 2013/0306186 A1 | 11/2013 | Goulet | |
| 2014/0014583 A1 | 1/2014 | Hanemaaijer | |
| 2015/0166371 A1* | 6/2015 | Escher | B01D 61/364 210/640 |

OTHER PUBLICATIONS

Singh and Sirkar, Desalination by Airgap Membrane Distillation using a Two Hollow-Fiber-Set Membrane Module, American Institute of Chemical Engineers National Meeting, Oct. 31, 2012, Pittsburgh, PA.

* cited by examiner

*Primary Examiner* — Patrick Orme
(74) *Attorney, Agent, or Firm* — Mark J. Rosen

(57) ABSTRACT

The invention is a modular, flexible, thermal, insulating, multilayered enclosure utilizing membrane distillation technology. The enclosure has a heat conducting layer, an insulation layer, and a layer of hydrophobic, polymeric hollow fiber membranes between the insulation layer and conductive layer. The enclosure is wrapped around a heat exhaust to absorb and transfer heat to the hollow fiber membranes to facilitate membrane distillation enabling production of potable water.

15 Claims, 7 Drawing Sheets

MODULAR THERMAL INSULATING ENCLOSURE FOR DESALINATING SEAWATER

STATEMENT OF GOVERNMENT INTEREST

The invention described herein may be manufactured and used by, or for the Government of the United States of America, for governmental purposes without payment of any royalties thereon or therefore.

BACKGROUND

Sailors often require significantly more potable water than can be physically stored on board sea going vessels. Therefore, they usually incorporate potable water generating systems using distillation or reverse osmosis technology.

Reverse osmosis (RO) is a water purification technology that uses a semipermeable membrane to remove dissolved solids from water. During reverse osmosis, an applied pressure is used to overcome the water's osmotic pressure (a colligative property) that is driven by chemical potential differences (a thermodynamic parameter) of the solvent. Osmotic pressure is proportional to the salt content of water. During the RO process, fresh water is forced across the membrane, and the resulting brine stream is reduced in pressure and discharged. The result is that the solute is retained on the pressurized side of the membrane and the pure solvent is allowed to pass to the other side.

Major drawbacks of reverse osmosis are high-energy and high-pressure requirements. Energy usage for the RO process can be as high as 65 kwh/kgal (energy requirement per thousand gallons of fresh water produced), and pressure in shipboard reverse osmosis units typically reaches 1000 psi, requiring both high-energy intensive pumps and high pressure rated piping. Even with the best components, RO units falter under these intense energy and pressure requirements, necessitating frequent and expensive maintenance actions.

An alternative to reverse osmosis is membrane distillation (MD), which is a process where feed water is desalinated using heat and contact with a porous, polymeric membrane. The porous membrane has a hydrophobic coating, which when combined with small pore sizes, makes it impervious to water. Membrane distillation works by increasing the water's vapor pressure by heating it. A portion of the water evaporates (only pure water completely evaporates), leaving behind a brine solution. The pure water vapor permeates the pores of one side (feed side) of the polymeric membrane, and is condensed on the other side (permeate side) of the membrane.

There are several types of MD known in the art. Two of the more common types are direct contact membrane distillation (DCMD) and air gap membrane distillation (AGMD). During DCMD, the condensate is in direct contact with the membrane surface, and condensation occurs at the membrane-fluid interface. The membrane pores are not wetted due to the combination of pore size and surface hydrophobicity, similar to the conditions on the feed side. During AGMD, the condensing surface is removed from the membrane surface by a short distance. Any vapor permeating the membrane must transit this distance prior to condensing on a condensing surface. AGMD typically has lower flux rates due to the added mass transfer resistance of vapor diffusion through the air gap but is typically more thermally efficient due to a reduction in heat conduction from the feed side to the permeate side of the membrane. DCMD can have a higher permeate flux, and may be simpler to operate, but has a greater degree of conductive heat loss across the membrane (from the feed to the condensate) which must be considered and minimized where possible. There are two other types of membrane distillation, vacuum membrane distillation (VIVID) and sweep gas membrane distillation (SGMD). Both VIVID and SGMD utilize a heated solution contacted with a porous, hydrophobic membrane, however, the differences are in the condensate collection. In the VIVID process, the permeate side of the membrane is held at a reduced pressure, aiding in vapor transport across the membrane. If necessary, permeate may be condensed in a separate device. In the SGMD process, a stripping gas is used to remove the permeated vapor.

Both the DCMD and AGMD membrane distillation methods require a heat source for operation. Many seagoing vessels produce a significant amount of heat energy from the combustion of fossil fuels, and this heat energy is dissipated through exhaust stacks.

There have been many attempts to recover this energy. In naval vessels, attempts have been made to recover heat energy by placing a heat exchanger directly in the exhaust stream using the captured heat energy to produce electrical power via an organic rankine cycle or similar process. However, heat exchangers often create a pressure drop within the exhaust stack, negatively impacting the engine performance. Also, soot deposits form in the heat exchanger, and negatively impact its performance. Moreover, there is limited space on ships around exhaust stacks for additional equipment often making a heat exchanger an unworkable option.

Apart from recovering the heat energy from exhaust stacks, another concern is the transfer of this heat through the exhaust stack to other parts of the vessel. To prevent this, the exhaust stacks are often wrapped with insulation. FIG. 1 is a diagram of a typical exhaust stack (100). Much of the heat exhaust (130) generated from the shipboard engines is dispersed through the exhaust stack (100) to the surrounding areas (120). In many sea-going vessels, this heat (120) is absorbed by the vessel wall, which raises the temperature of the vessel. The insulation (110) is the key to limiting this transfer of heat.

This invention utilizes membrane technology to produce potable water on vessels, while providing heat insulation to exhaust stacks, thus eliminating the drawbacks of heat exchangers and other heat recovery equipment. The inventor layers insulation and membrane distillation technology to capture the heat energy dissipated through vessel exhaust stacks and uses it to desalinate seawater for potable water for shipboard needs.

SUMMARY

The invention is a modular multilayered thermal enclosure comprising a heat conducting layer, a membrane distillation layer, and an insulation layer. In one embodiment, the enclosure wraps around a ship's exhaust stack to absorb heat through its heat conducting layer. This heat increases the temperature and, thus, the vapor pressure of the seawater that is pumped to the enclosure. The warmed seawater contacts a layer of porous, hollow fiber, hydrophobic membranes. A portion of the seawater vaporizes at the membrane surface and permeates the porous membrane, resulting in a brine solution that has a higher level of salinity than the feed seawater. This brine is pumped out of the enclosure and discharged overboard. Simultaneously, potable water is pumped through the inside of the porous, hollow fiber, hydrophobic membranes to act as the condensing fluid for permeated water vapor. The water lost from the feed seawater is gained as condensate.

In a preferred embodiment, the inventive enclosure comprises a pliable multilayered casing, with a first end and a second end, for wrapping around the exhaust stack. The first and second ends of the enclosure have connecting fasteners to secure the enclosure to the exhaust stack.

The layers comprise a flexible heat conducting layer, a layer of porous hydrophobic hollow fiber membranes adjacent to the heat conducting layer, and an external insulation layer adjacent to the layer of porous hydrophobic hollow fiber membranes. The enclosure also comprises at least four plumbing connections to facilitate the distillation processes by pumping sea water, brine and potable water to and from the hollow fiber membranes. A first plumbing connection pumps seawater to the porous hydrophobic hollow fiber membranes. A second plumbing connection pumps brine from the porous hydrophobic hollow fiber membranes. A third plumbing connection pumps potable water to the porous hydrophobic hollow fiber membranes. A fourth plumbing connection pumps potable water from the porous hydrophobic hollow fiber membranes.

The thermal insulating enclosure can be sized to fit a variety of exhaust stacks of various lengths and diameters. The enclosure layers can also be designed to various thickness levels to optimize the capture, regulate a range of temperatures, and accommodate various amounts of water. The ends of the enclosure can be secured together using a variety of fasteners. Also, because of its modularity and pliability, the enclosure is not limited to exhaust stacks. It can be designed to fit any heat source, either by wrapping it around the source or securing it flat against the heat source. Moreover, the enclosure can incorporate a variety of membrane distillation technologies, including direct membrane distillation (MD) and air gap membrane distillation (AGMD).

DRAWINGS

DETAILED DESCRIPTION

Figure 1:
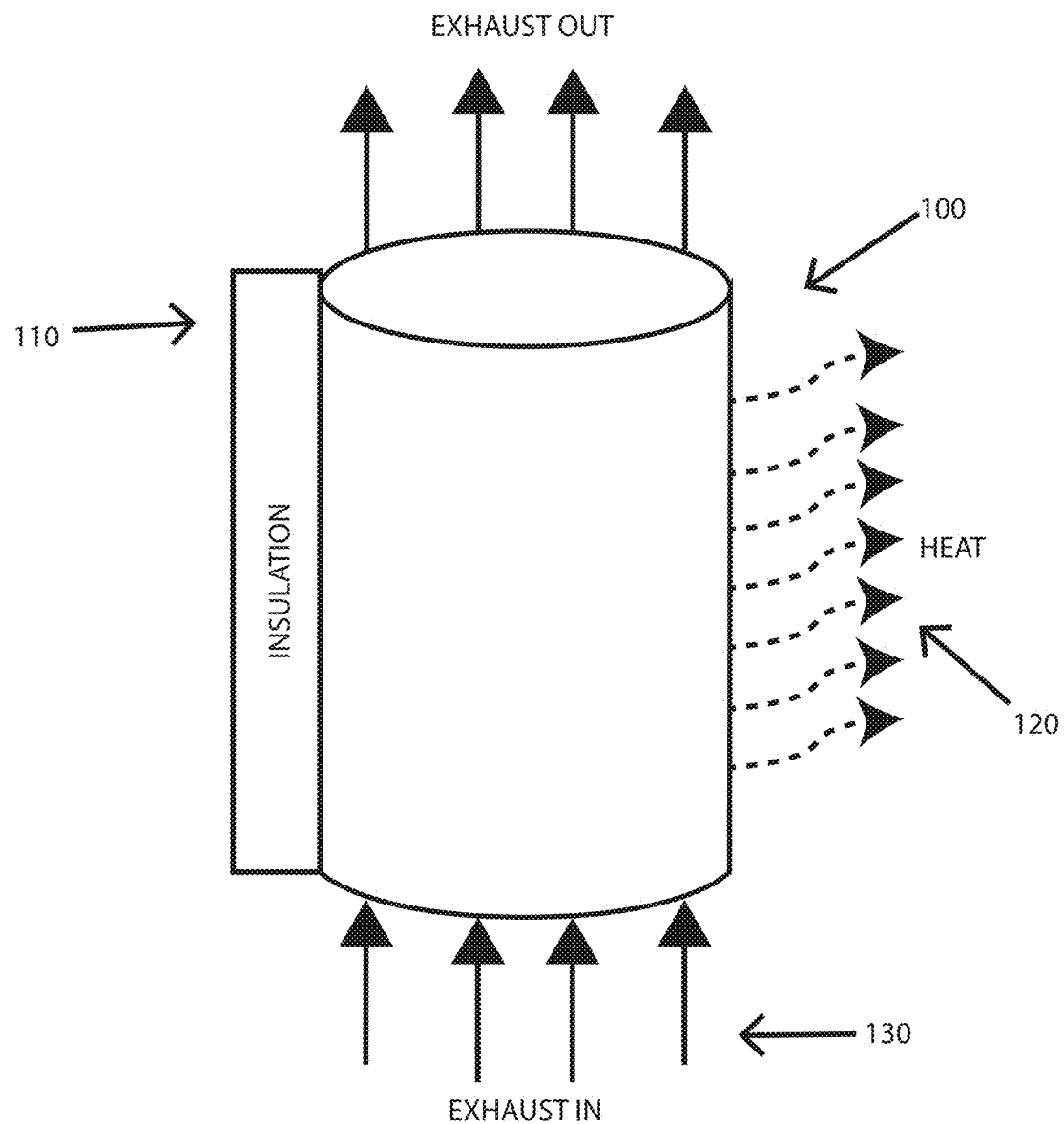
FIG. 1 (Prior Art) is a diagram of an exhaust stack with insulation.
Figure 2:
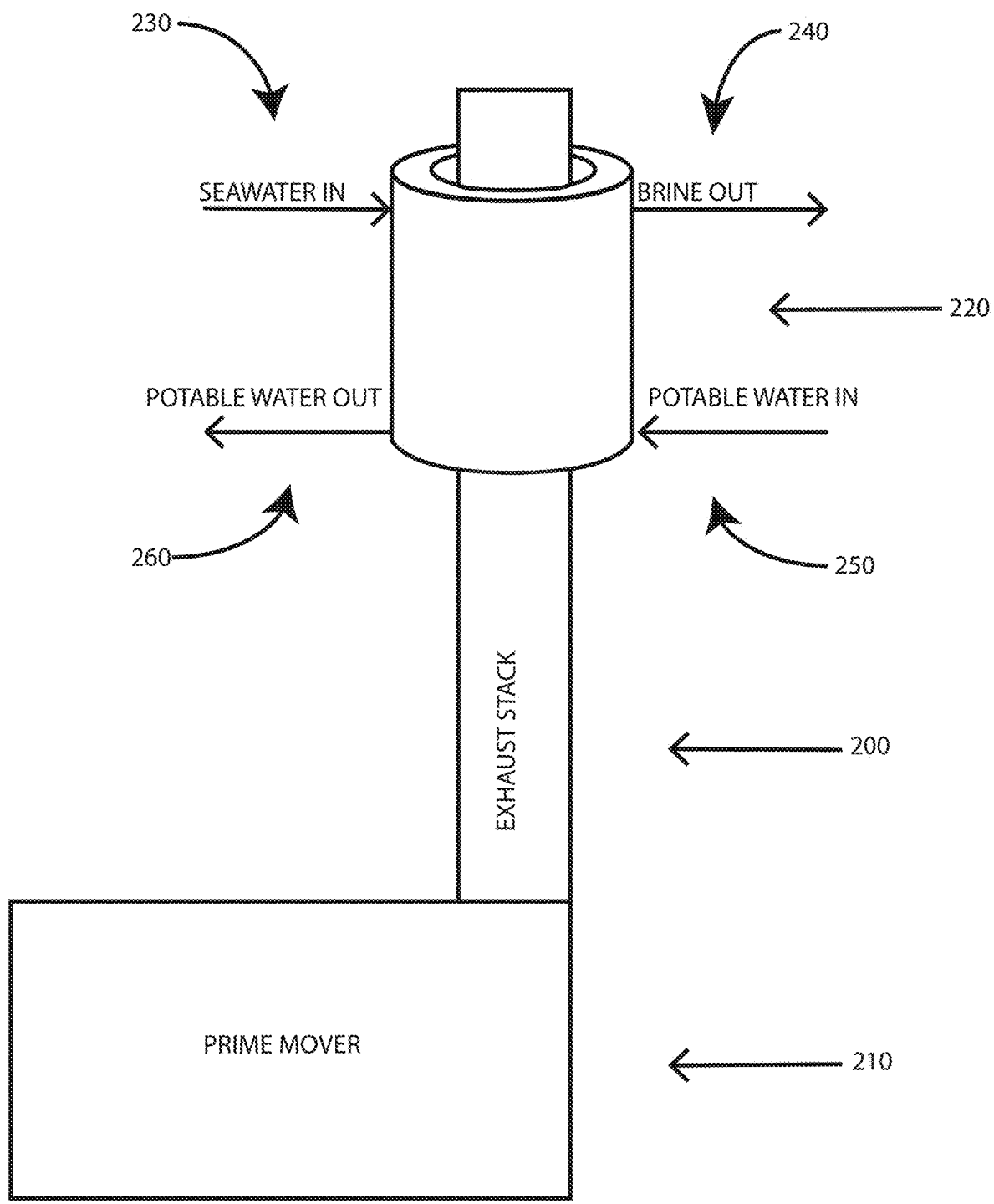
FIG. 2 is a diagram of an embodiment of the modular thermal insulating enclosure installed on an exhaust stack.

Referring to FIG. 2, a schematic of an embodiment of the modular thermal insulating enclosure is shown. The modular thermal insulating enclosure (220) is wrapped around the exhaust stack (200) which extends from a prime mover (210). The prime mover (210) is any source of energy including an engine. In FIG. 2, the modular thermal enclosure (220) covers only a small portion of the exhaust stack (200). However, the enclosure can be sized and configured to wrap around a longer portion of the exhaust stack or the entire exhaust stack depending on the type of membrane distillation method used and the quantity of potable water needed.

In the FIG. 2 embodiment, the modular thermal enclosure (220) is one continuous cylindrical unit that is installed by wrapping the enclosure (220) around the exhaust stack (200). The modular thermal insulating enclosure (220) uses the heat recovered from the exterior of an exhaust stack (200) to produce fresh water from seawater using membrane distillation. Because the quantity of heat being transferred through the exhaust stack (200) may be too hot to place the wrap directly on the surface of the exhaust stack, an intermediary layer (not shown) can be added between the surface of the exhaust stack and the enclosure to regulate the temperature of the thermal enclosure to prevent overheating the seawater or melting the polymeric membranes.

Membrane distillation is a thermally-driven process that utilizes differences in vapor pressure to permeate water through a micro porous membrane and reject other non-volatile constituents present in the influent water. The feed stream is heated, and due to an increased vapor pressure, fresh water vaporizes at the membrane surface and transports across a membrane, where it is condensed (or removed for condensation in a secondary process). The membrane is porous, polymeric, and often treated with a coating to make it hydrophobic. The membranes may be in a hollow fiber configuration or flat sheet configuration. The combination of hydrophobicity and small pore size prevents the feed or distillate streams from wetting the membrane.

Seawater (230) is pumped to the enclosure where it is partially distilled to produce potable water, leaving behind a brine solution. The partially distilled water is collected at the porous hydrophobic membranes within the enclosure, and brine (240) is pumped out of the enclosure (220) and collected. Then, a first stream of potable water (250) is pumped to the membranes within the enclosure to aid condensation of the water vapor, and a second stream of potable water (260) is pumped out of the enclosure (220). The seawater—brine stream and potable water streams are separated on either side of the membrane. The water lost by the seawater-brine stream is recovered as potable water (260)

Figure 3:
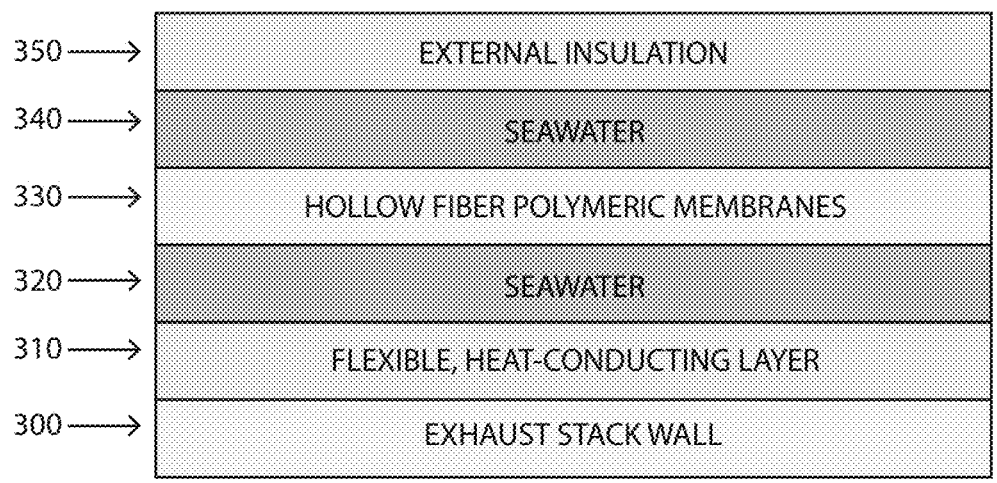
FIG. 3 is a schematic of a version of direct contact membrane distillation used within an embodiment of the thermal insulating enclosure.

FIG. 3 shows a version of direct contact membrane distillation membrane (DCMD) technology that can be used within an embodiment of the modular thermal insulating enclosure. This version is shown in FIG. 3. The inner most layer is a flexible heat conducting layer (310) that is in direct contact with the exhaust stack wall (300). The heat conducting layer (310) absorbs heat from the exhaust stack wall (300) to heat seawater (320 & 340) for distillation. Adjacent to the heat conducting layer (310) is the hollow fiber membrane layer (330). On the other side of the hollow fiber polymeric membranes (330) is an external insulation layer (350). The external insulation (350) keeps heat from escaping the enclosure and raising the temperature of surrounding areas. If an intermediate layer is required to reduce the amount of heat delivered to hollow fiber polymeric membranes, it is placed between the heat conducting layer (310) and the exhaust stack wall (300).

Figure 4:
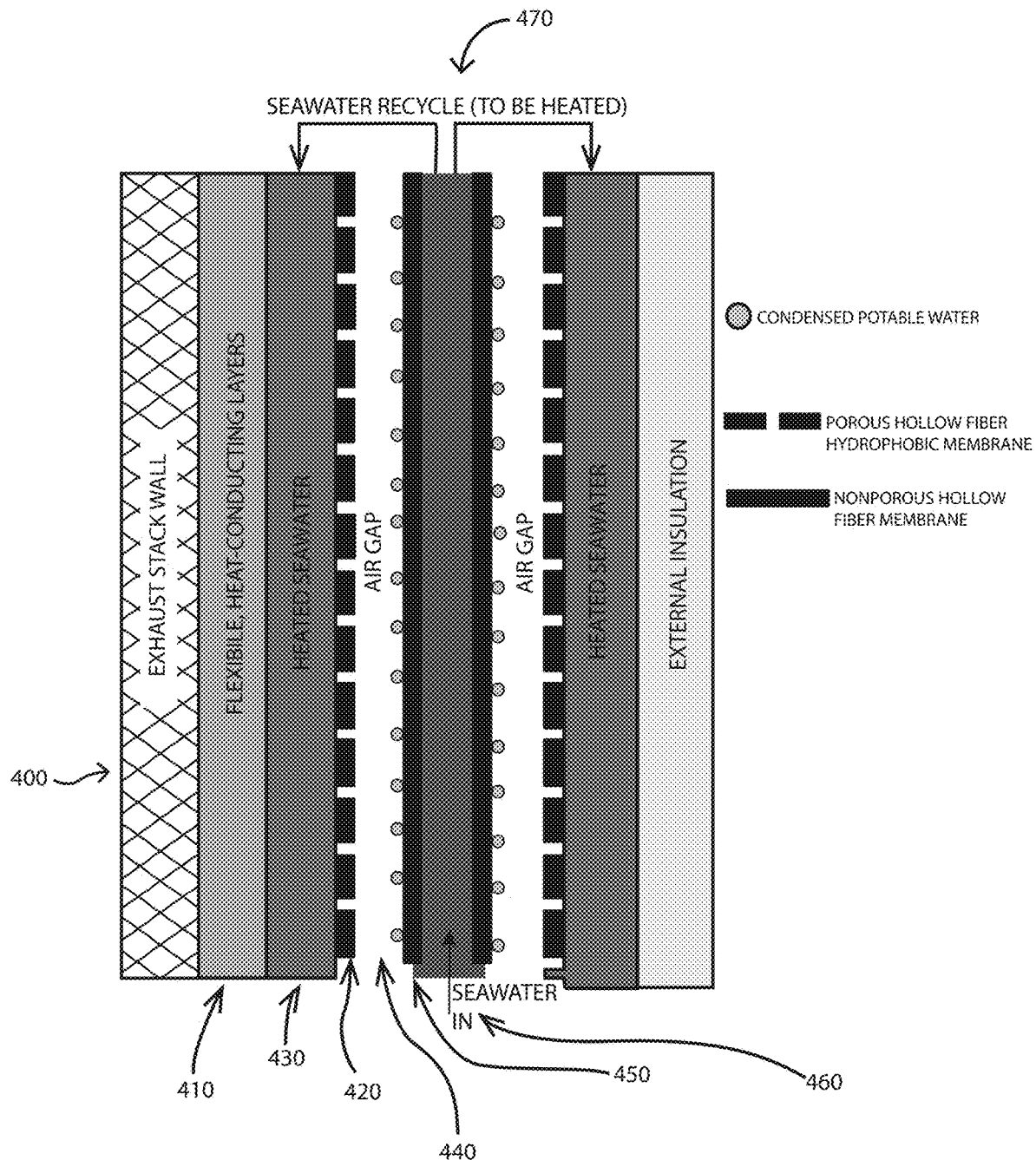
FIG. 4 is a schematic of a version of air gap membrane distillation used within and embodiment thermal insulating enclosure.

Air gap membrane distillation (AGMD) technology can also be utilized with the modular thermal insulating disclosure. An example of the AGMD is shown in FIG. 4. Like the direct contact membrane distillation, AGMD includes a flexible heat conducting layer (410) that directly contacts the exhaust stack wall (400) to heat seawater (430). Adjacent to the flexible heat conducting layer (410) is a porous hollow fiber hydrophobic membrane layer (420). Seawater (430) is pumped between the flexible heat conducting layer (410) and the porous hollow fiber hydrophobic membranes (420). The seawater (430) is warmed and vaporized by the heat from the exhaust stack. Then, the vapor travels across the porous hollow fiber membranes (420) and transverses a small air gap (440) to condense on the condensing surface (450) (shown as a layer of nonporous hollow fiber membranes).

In air gap membrane distillation, a combination of porous (420) and nonporous (450) membranes can be used to reduce the overall size of the process. These membranes are use in this embodiment to maintain the compact modularity of the thermal enclosure. Known water flow patterns, such as using inlet seawater (460) as the cooling fluid, are also leveraged to recycle water into the enclosure (470).

While air gap membrane distillation is more thermally efficient than direct contact membrane distillation (the air gap minimizes conductive heat loss from the seawater to the permeate sides of membrane), the flux is typically lower, due to the added mass transfer resistance of the water vapor needing to diffuse across the air gap (440).

Figure 5:
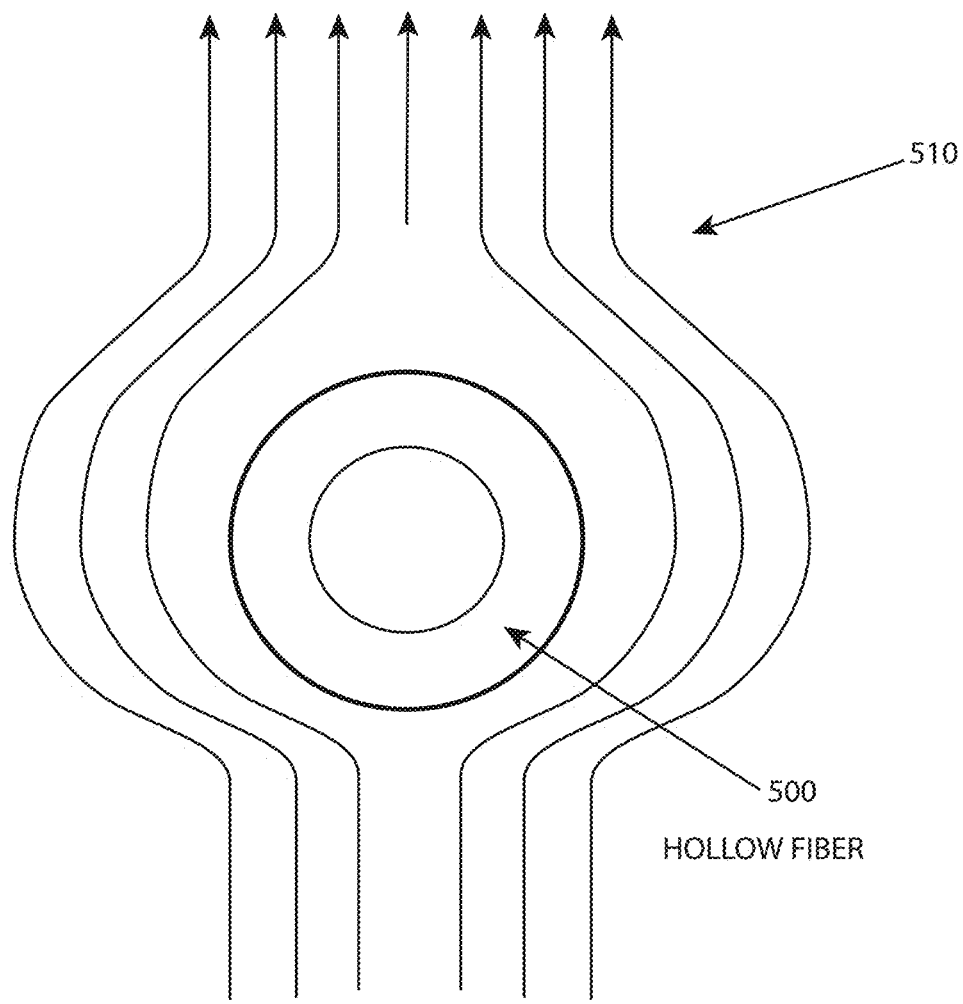
FIG. 5 (Prior Art) is a diagram of the water flow around a hollow fiber membrane.

However, both methods utilize hollow fiber membranes, which have the advantage of being able to pack large amounts of surface area per volume, which can be as high as $3000/m^2/m^3$. An example of a hollow fiber membrane (500) is shown in prior art FIG. 5. Hollow fiber membranes are similar to a shell and tube heat exchanger configuration, where the seawater flows on the shell side. Water flows around a single hollow fiber membrane as indicated by the arrows (510) in FIG. 5. In the single example shown, fresh water would travel in a direction orthogonal to the plane of the page, i.e., in a direction towards or away from the viewer.

Figure 6:
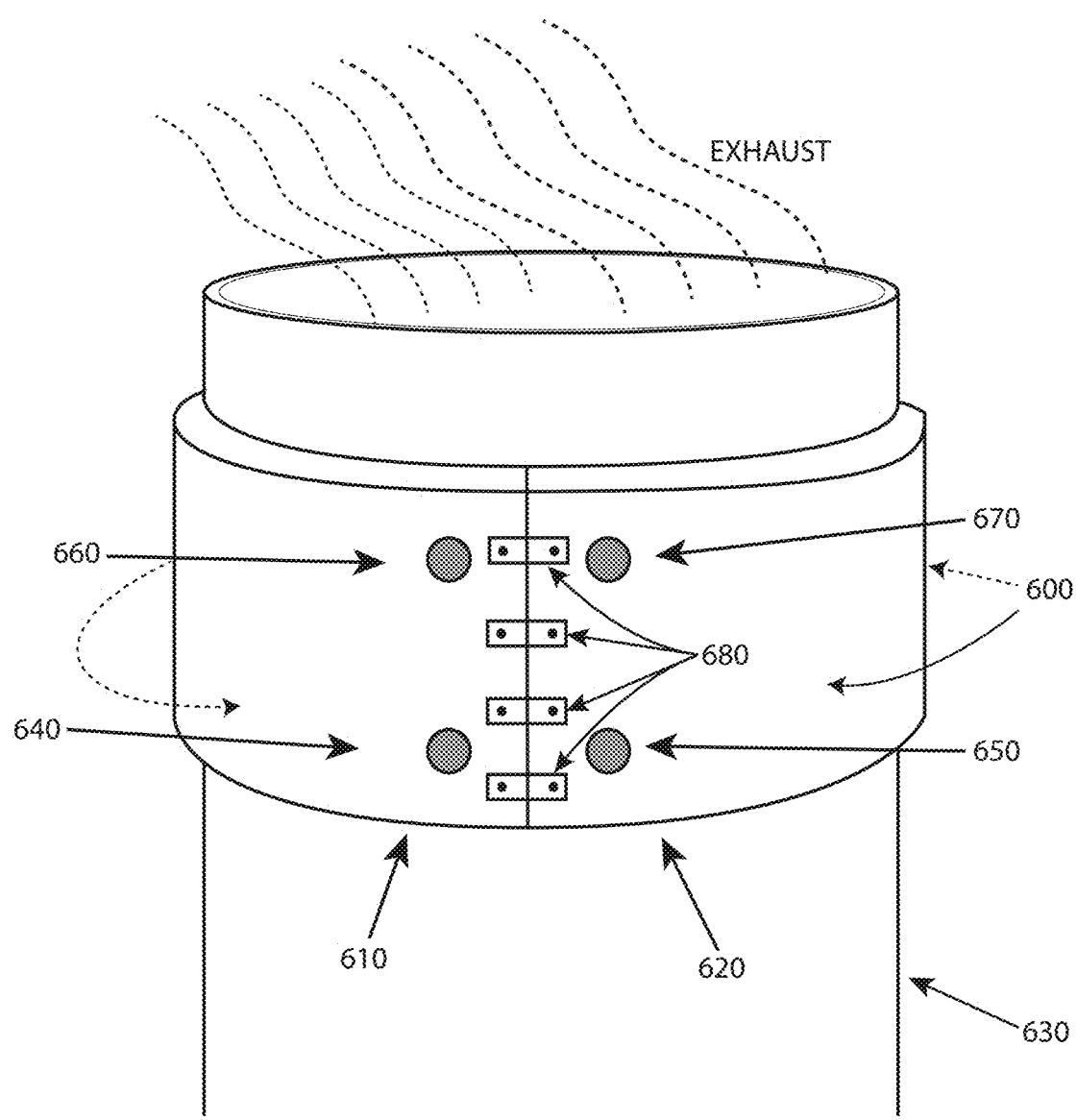
FIG. 6 is a diagram of the preferred embodiment of the modular thermal insulating enclosure with fasteners.

Because of the novel employment of membrane distillation technology, the thermal insulating enclosure is flexible and modular allowing it to be used in a variety of ways and in a variety of applications. FIG. 6 shows the preferred embodiment of the enclosure (600). To facilitate installation, the enclosure (600) includes fasteners (680) on each of its ends (610 and 620). The fasteners (680) connect to each other to secure the flexible enclosure (600) to the exhaust stack (630). A variety of types of fasteners (680) can be used. The fasteners (680) can be male/female type buttons, Velcro, magnets etc. Also shown are the four ports (640, 650, 660, and 670) to which plumbing is connected to facilitate the distillation process as discussed above. A first port (640) is used to pump seawater to the porous hydrophobic hollow fiber membranes. A second plumbing port (650) is used to pump brine from the porous hydrophobic hollow fiber membranes. A third port (660) is used to pump potable water to the porous hydrophobic hollow fiber membranes. A fourth plumbing port (670) is used to pump potable water from the porous hydrophobic hollow fiber membranes.

Figure 7:
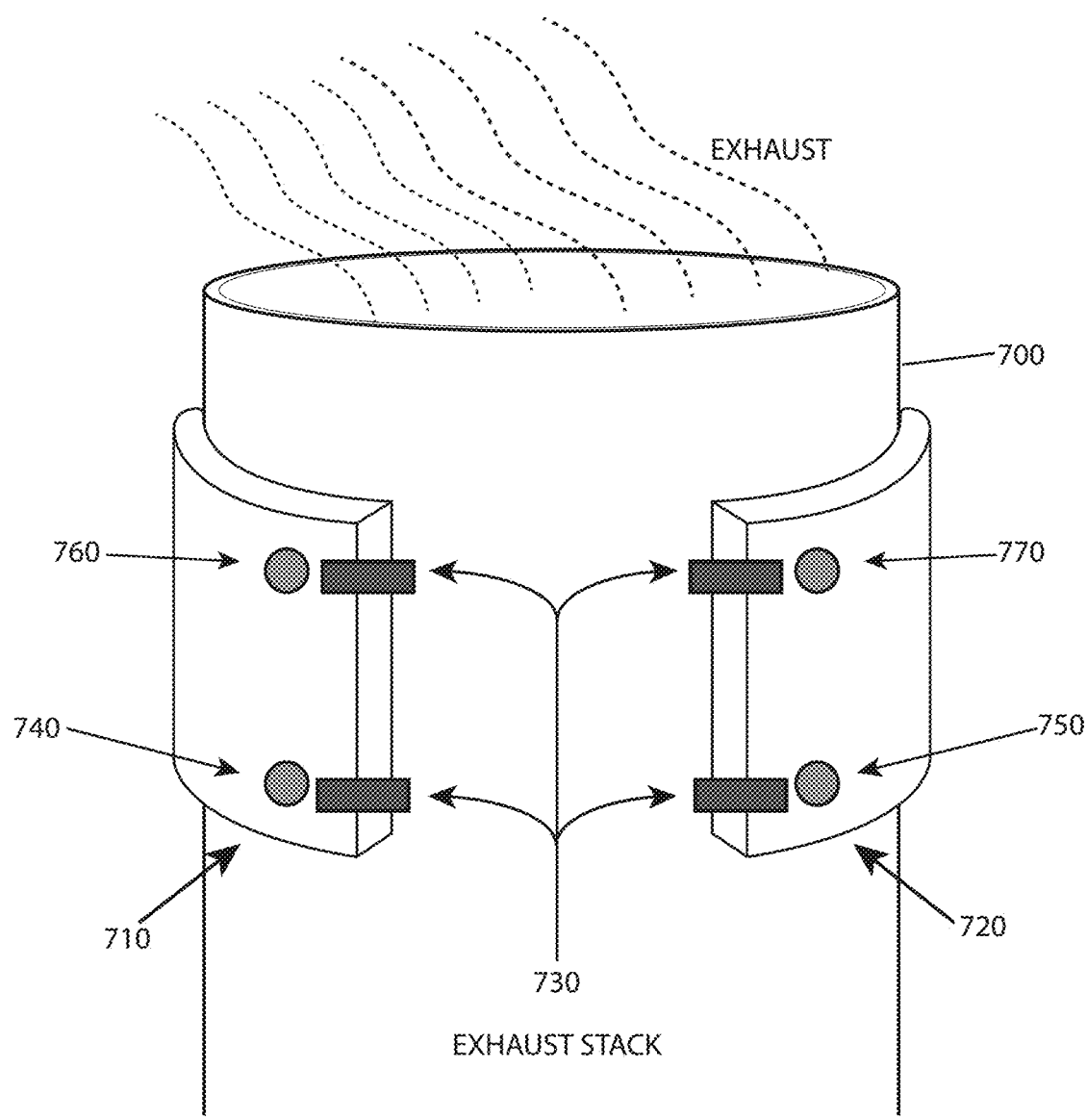
FIG. 7 is a diagram of an embodiment of the modular thermal insulation enclosure with connectors attached directly to an exhaust stack.

FIG. 7 illustrates an alternate embodiment of the modular thermal insulating enclosure. In FIG. 7 the enclosure does not wrap all the way around the exhaust stack (700), Instead, the first end (710) and the second end (720) each attach to the exhaust stack (700) via connectors (730). The connectors (730) can be made from a variety of materials that can be secured to a heat source, including magnets, double sided adhesive, bolts, etc. It follows that this embodiment of the modular thermal insulating enclosure can be attached to any heat-generating source. Ports (740, 750, 760, and 770) are again included to show the plumbing connections for facilitating the distillation process.

Although the invention has been described in detail with particular reference to these preferred embodiments, other embodiments can achieve the same results. Variations and modifications of the present invention will be obvious to those skilled in the art and it is the intent of the applicant, with this application, to cover, in the appended claims, all such modification and equivalents. The entire disclosure and all references, applications, patents and publications cited above are hereby incorporated by reference.

What is claimed is:

1. A pliable modular thermal insulating enclosure for desalinating water using heat from a planar or curved planar heat source comprising:
   a first end having a first fastener attached thereto and a second end having a second fastener attached thereto, for wrapping and attaching the enclosure around the heat source;
   a flexible heat conducting layer, a length and a width of the flexible heat conducting layer each respectively being substantially the same as the enclosure;
   a layer of porous hydrophobic hollow fiber membranes adjacent to the heat conducting layer;
   an external insulation layer adjacent to the layer of porous hydrophobic hollow fiber membranes;
   wherein, in order, the flexible heat conducting layer, the layer of porous hydrophobic hollow fiber membranes, and the external insulation layer are stacked atop each other, with the heat conducting layer to be positioned adjacent to the heat source; and
   a plurality of ports for plumbing connections to carry seawater to the enclosure, carry brine from the enclosure, and carry potable water to and from the enclosure;
   wherein when the enclosure is wrapped around the heat source, the flexible heat conducting layer heats water surrounding the porous hydrophobic hollow fiber membranes and the enclosure desalinates the water.

2. The pliable modular thermal insulating enclosure of claim 1, wherein the enclosure wraps around only a portion of the heat source.

3. The pliable modular thermal insulating enclosure of claim 1, wherein the enclosure wraps completely around the heat source.

4. The pliable modular thermal insulating enclosure of claim 1, wherein the heat source is an exhaust stack.

5. The pliable modular thermal insulating enclosure of claim 1, wherein the ports connect to plumbing comprising:
   a first plumbing connection to carry salinated water to the layer of porous hydrophobic hollow fiber membranes;
   a second plumbing connection to carry brine from the layer of porous hydrophobic hollow fiber membranes; and
   a third plumbing connection to carry potable water to the layer of porous hydrophobic hollow fiber membranes;
   a fourth plumbing connection to carry potable water from the layer of porous hydrophobic hollow fiber membranes.

6. The pliable modular thermal insulating enclosure of claim 1, wherein the heat source is curved planar.

7. The pliable modular thermal insulating enclosure of claim 6, wherein the curved planar heat source is an exhaust stack.

8. A pliable modular thermal insulating enclosure for desalinating water using heat from a planar or curved planar heat source comprising:
   a first end having a first fastener attached thereto and a second end having a second fastener attached thereto, for wrapping and attaching the enclosure around the heat source;

a flexible heat conducting layer, a length and a width of the flexible heat conducting layer each respectively being substantially the same as the enclosure;

an external insulation layer opposite the flexible heat conducting layer;

a layer of porous hydrophobic hollow fiber membranes between the flexible heat conducting layer and the external insulation layer;

non-porous hydrophobic hollow fiber membranes inside the porous hydrophobic hollow fiber membranes separated therefrom by air gaps;

wherein, in order, the flexible heat conducting layer, the layer of porous hydrophobic hollow fiber membranes, and the external insulation layer are stacked atop each other, with the heat conducting layer to be positioned adjacent to the heat source; and a plurality of ports for plumbing connections to carry seawater to the enclosure, carry brine from the enclosure, and carry potable water from the enclosure;

wherein when the enclosure is wrapped around the heat source, the flexible heat conducting layer heats water surrounding the porous hydrophobic hollow fiber membranes and the enclosure desalinates the water.

9. The pliable modular thermal insulating enclosure of claim 8, wherein the enclosure wraps around only a portion of the heat source.

10. The pliable modular thermal insulating enclosure of claim 8, wherein the enclosure wraps completely around the heat source.

11. The pliable modular thermal insulating enclosure of claim 8, wherein the heat source is an exhaust stack.

12. The pliable modular thermal insulating enclosure of claim 8, wherein the ports connect to plumbing comprising:

a first plumbing connection to carry salinated water to the layer of porous hydrophobic hollow fiber membranes;

a second plumbing connection to carry brine from the layer of porous hydrophobic hollow fiber membranes; and a third plumbing connection to carry potable water from the layer of porous hydrophobic hollow fiber membranes.

13. The pliable modular thermal insulating enclosure of claim 12, further comprising a fourth plumbing connection to carry potable water to the layer of porous hydrophobic hollow fiber membranes.

14. The pliable modular thermal insulating enclosure of claim 8, wherein the heat source is curved planar.

15. The pliable modular thermal insulating enclosure of claim 14, wherein the curved planar heat source is an exhaust stack.

\* \* \* \* \*